US008905571B2

(12) United States Patent
Sigler (10) Patent No.: US 8,905,571 B2
(45) Date of Patent: Dec. 9, 2014

(54) ILLUMINATED WARNING PANEL (71) Applicant: Charles A. Sigler, New Smyrna Beach, FL (US)

(72) Inventor: Charles A. Sigler, New Smyrna Beach, FL (US)

(*) Notice: Subject to any disclaimer, the term of this patent is extended or adjusted under 35 U.S.C. 154(b) by 76 days.

(21) Appl. No.: 13/847,603

(22) Filed: Mar. 20, 2013

(65) Prior Publication Data

US 2014/0286039 A1    Sep. 25, 2014

(51) Int. Cl.
*F21V 8/00* (2006.01)
*F21K 99/00* (2010.01)
*F21V 33/00* (2006.01)

(52) U.S. Cl.
CPC ............. *F21V 33/00* (2013.01); *G02B 6/0096* (2013.01); *F21K 9/52* (2013.01)
USPC ......... 362/153; 362/153.1; 362/559; 362/576

(58) Field of Classification Search
USPC .............. 362/576, 559, 145, 153, 153.1, 234, 362/253
See application file for complete search history.

(56) References Cited

U.S. PATENT DOCUMENTS

| | | | | |
|---|---|---|---|---|
| 4,907,361 A | * | 3/1990 | Villard | 40/565 |
| 4,992,914 A | * | 2/1991 | Heiss et al. | 362/153.1 |
| 5,771,617 A | * | 6/1998 | Baker | 40/544 |
| 5,951,144 A | * | 9/1999 | Gavigan et al. | 362/153 |
| 6,082,886 A | * | 7/2000 | Stanford | 362/576 |
| 6,116,751 A | * | 9/2000 | Remp | 362/153 |
| 8,087,810 B2 | * | 1/2012 | Isaacson | 362/565 |
| 2003/0156405 A1 | * | 8/2003 | Kim | 362/153.1 |
| 2004/0032748 A1 | * | 2/2004 | Trudeau et al. | 362/554 |
| 2005/0057944 A1 | * | 3/2005 | Pipo et al. | 362/559 |
| 2006/0044791 A1 | * | 3/2006 | Sooferian | 362/153 |
| 2006/0291196 A1 | * | 12/2006 | Benavente | 362/153.1 |
| 2007/0159814 A1 | * | 7/2007 | Jacobsson | 362/153 |
| 2010/0188842 A1 | * | 7/2010 | Yohananoff | 362/153.1 |
| 2011/0310595 A1 | * | 12/2011 | Hardesty | 362/153 |
| 2012/0106194 A1 | * | 5/2012 | Ashoff et al. | 362/602 |
| 2013/0120975 A1 | * | 5/2013 | Van Herpen | 362/147 |

* cited by examiner

*Primary Examiner* — Laura Tso
(74) *Attorney, Agent, or Firm* — J. Wiley Horton (57) ABSTRACT

A detectable warning panel including an illumination feature. The warning panel includes an array of raised domes as for prior art warning panels. The tops of at least a portion of the domes are illuminated. Preferably the tops of all the domes are illuminated. While the illumination feature may remain on at all times, in the preferred embodiment the illumination feature is switched on and off according to ambient lighting conditions.

20 Claims, 11 Drawing Sheets

ILLUMINATED WARNING PANEL

BACKGROUND OF THE INVENTION

1. Field of the Invention

This invention relates to the field of construction. More specifically, the invention comprises an illuminated warning panel intended to signify the presence of a sidewalk/roadway boundary to a pedestrian.

2. Description of the Related Art

Figure 1:
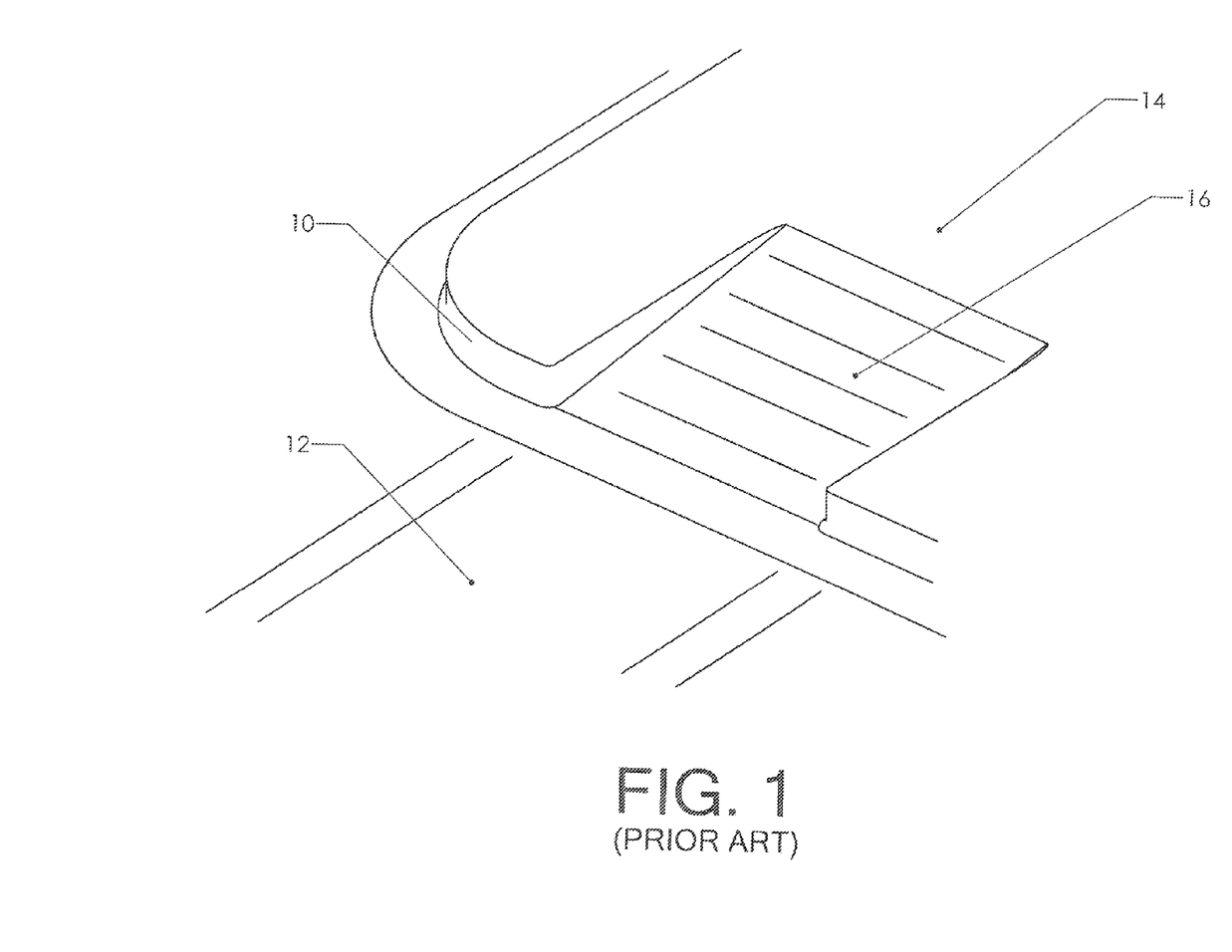
FIG. 1 is a perspective view, showing a prior art wheelchair accessible ramp between a roadway and a sidewalk.

The present invention is suitable for use as part of existing sidewalk/curb structures. A brief explanation of the prior art structures may therefore aid the reader's understanding. FIGS. 1-4 illustrate prior art structures. FIG. 1 shows a traditional sidewalk/curb interface intended to accommodate handicapped persons. Several decades ago, sidewalk 14 simply terminated at its intersection with curb 10. The sharp rise of the curb presented an obstacle to wheelchairs and to pedestrians unable to take a moderately high step.

The structure shown in FIG. 1 is typical of the first-generation solution to this problem. Curb ramp 16 cuts through curb 10 to connect side walk 14 to the road surface within defined crossing 12. The ramp surface allows a wheelchair to smoothly transition from the sidewalk to the roadway and vice versa.

Figure 2:
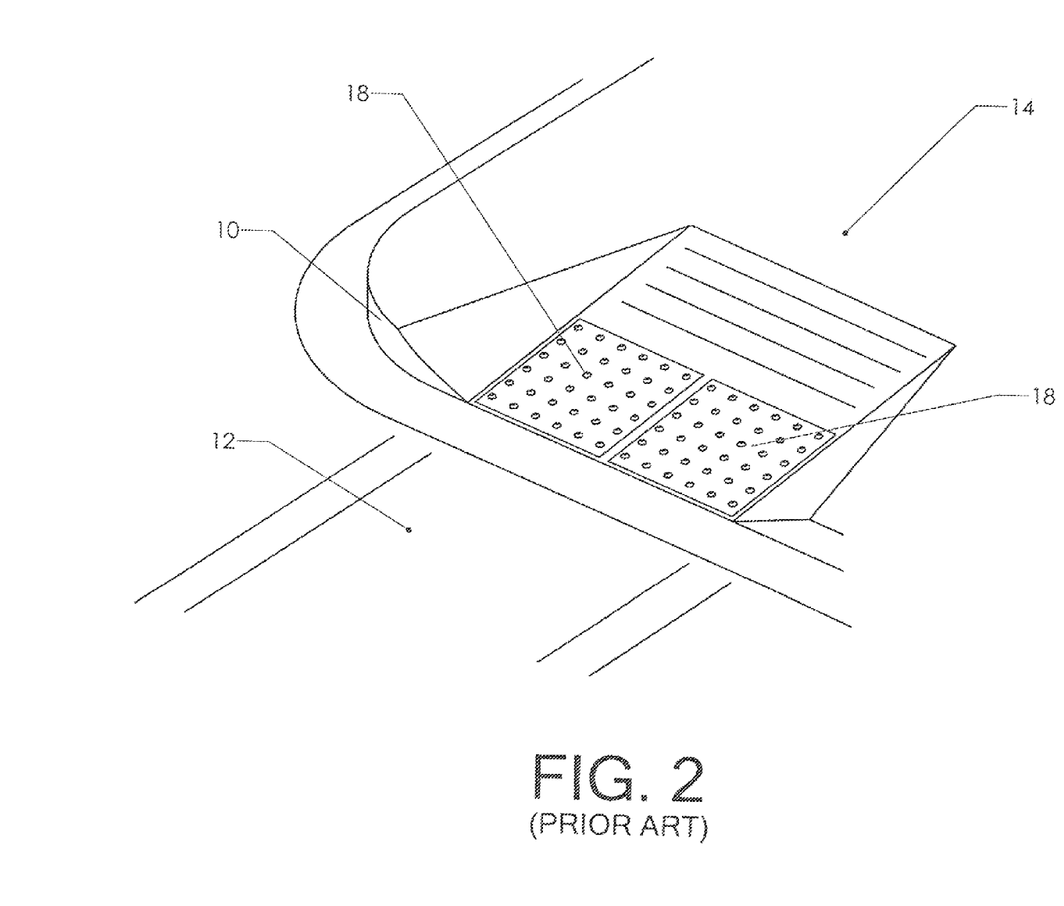
FIG. 2 is a perspective view, showing a pair of detectable warning panels placed on a ramp.

While functional, the ramp shown in FIG. 1 does not adequately warn visually-impaired persons that they are approaching a roadway. To address this issue, "detectable warning panels" are now added to the lower portion of the ramp. FIG. 2 shows a modified ramp assembly. Two detectable warning panels 18 have been affixed to the ramp near the portion that intersects the roadway. These warning panels include a pattern of raised domes (small "bumps"). The domes may be felt through the shoes of a person walking. They also vibrate the wheels of a wheelchair sufficiently to alert the wheelchair's operator. They are sometimes referred to as "Braille for the feet."

The panels are often also given a bright color—such as yellow. The coloring assists many people in recognizing the sidewalk/curb boundary. The combination of the pattern of raised domes and the bright coloring provides a positive indication of the boundary to able-bodied and disabled persons alike.

Figure 3:
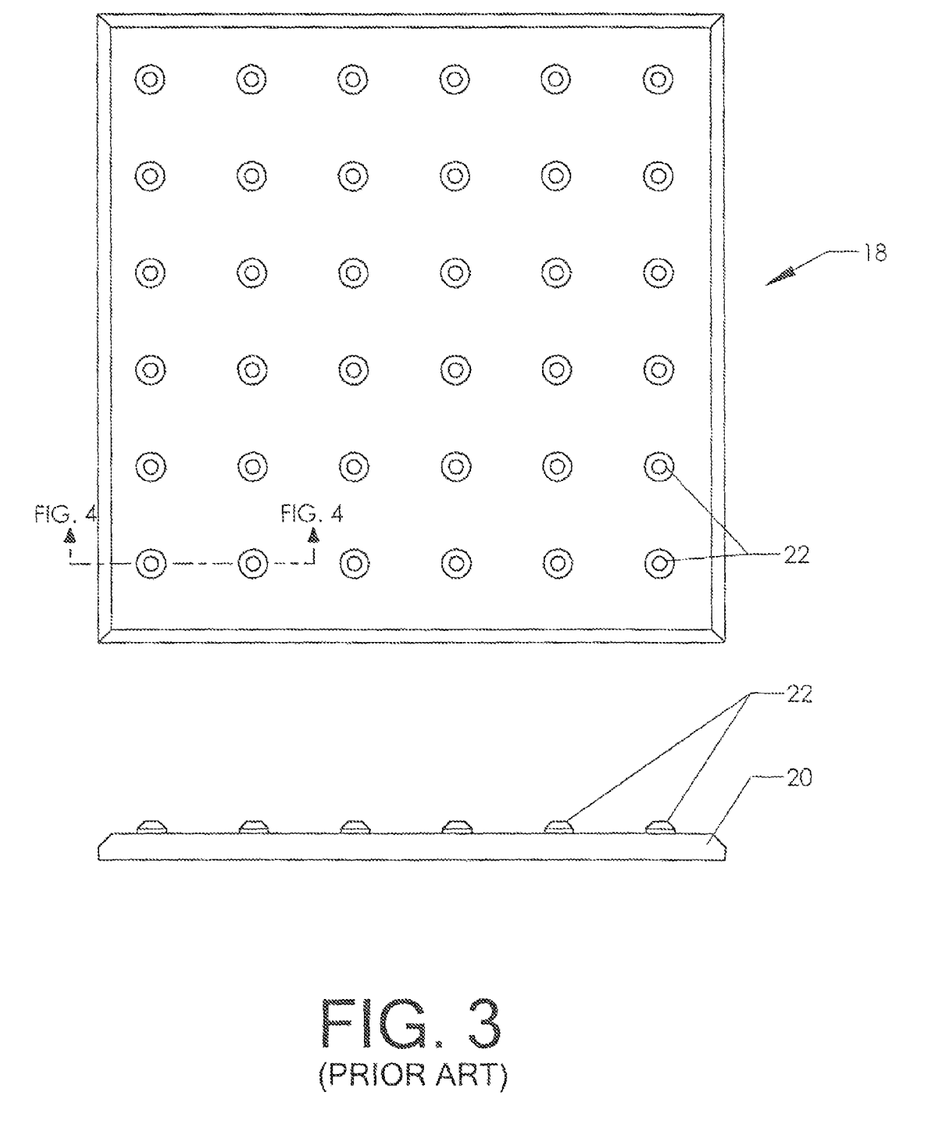
FIG. 3 shows a plan view and an elevation view of a typical prior art detectable warning panel.

FIG. 3 provides plan and elevation views for a detectable warning panel that is currently in widespread use. This particular panel is molded of fiber-reinforced thermoplastic. Base 20 is secured in position on a concrete sidewalk using adhesives, threaded fasteners, or the like. The pattern of domes protrudes upward from the base as shown in the elevation view.

Figure 4:
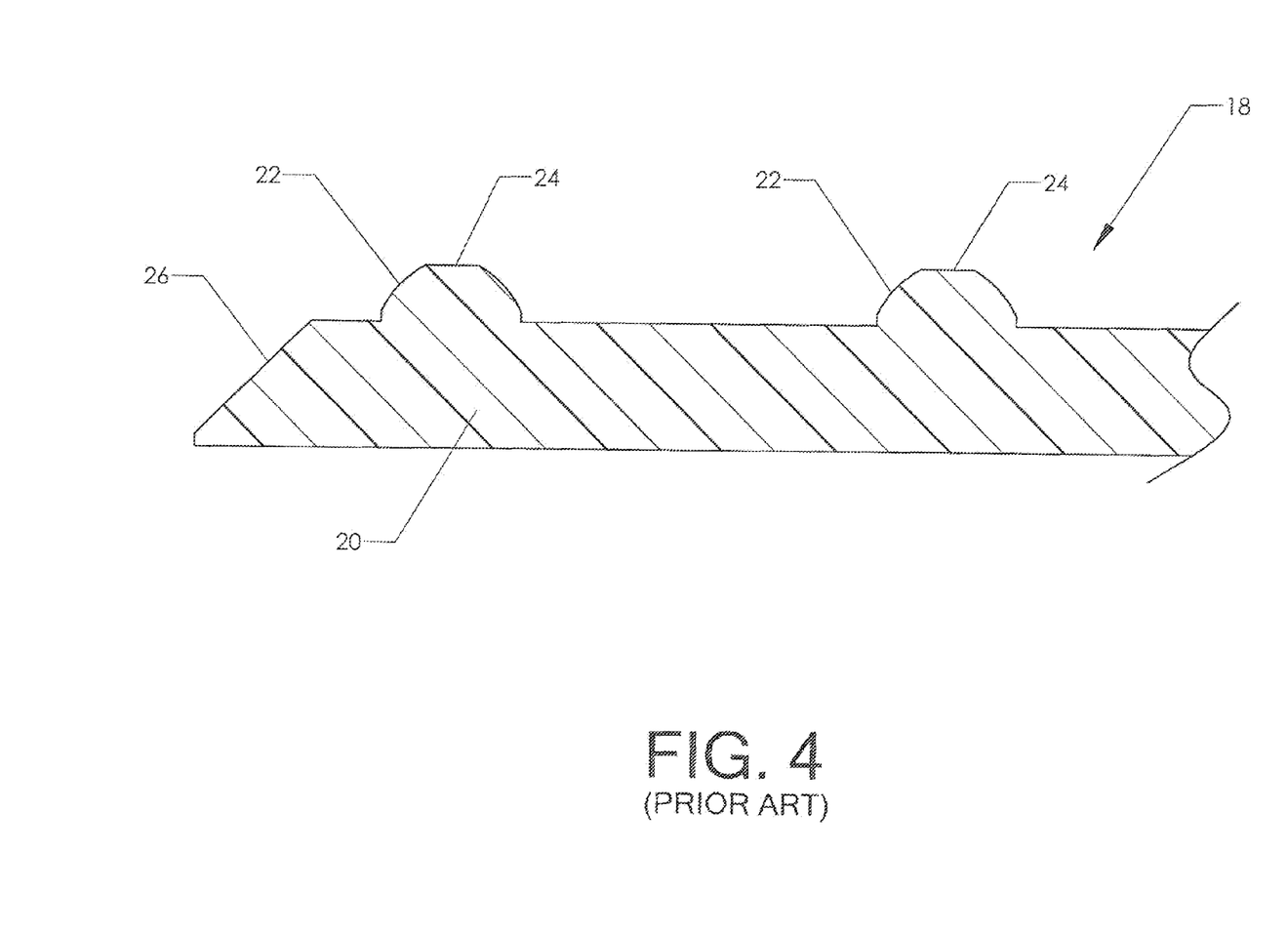
FIG. 4 is a sectional elevation view, showing details of the domes used on the prior art detectable warning panel.

FIG. 4 is a sectional view through a portion of the molded panel. The reader will observe that the panel is molded as an integral unit. Base 20 includes bevel 26 along its perimeter. Each dome 22 includes a flat 24 across its upper extreme. The base of each dome has a diameter of approximately 1 inch (25 mm). The dome-to-dome spacing is typically between about 1.5 inches (38 mm) and about 2.5 inches (64 mm).

Returning to FIG. 2, the reader will observe that two detectable warning panels 18 have been used to span the width of the ramp. Many prior art panels may be cut, ground, or otherwise fitted to the installation space. Thus, it is known to use 2½ panels in some applications. Still other prior art panels are made in long lengths (12"×36"). In that case a single panel may be used to span the desired width.

One disadvantage of the prior art warning panels involves their use in low light. On a dark street, the detectable warning panel may not be readily visible. In some circumstances the presence of the warning panels and particularly the presence of the pattern of raised domes may even create a trip hazard in low light. The present invention seeks to retain the advantages of the prior art warning panels while addressing the concern of their use in low light.

BRIEF SUMMARY OF THE PRESENT INVENTION

The present invention comprises a detectable warning panel including an illumination feature. The warning panel includes an array of raised domes as for prior art warning panels. The tops of at least a portion of the domes are illuminated. Preferably the tops of all the domes are illuminated. While the illumination feature may remain on at all times, it is preferable to switch the illumination feature on and off according to ambient lighting conditions. As an example, the light source employed could be switched on and off at the same time as the street lights in the vicinity of the warning panel.

The invention employs light pipes to carry the light to the raised domes on the warning panel. This approach allows the illuminated surface on the domes to be a wear surface. The light source itself may be remotely located so that it is not exposed to the harsh environment on the upward facing surface of the warning panel. Different configurations for the light pipes and illumination source are disclosed. Numerous other configurations will occur to those skilled in the at and the present invention is by no means limited to the configurations disclosed.

| REFERENCE NUMERALS IN THE DRAWINGS | | | |
|---|---|---|---|
| 10 | curb | 12 | defined crossing |
| 14 | sidewalk | 16 | curb ramp |
| 18 | detectable warning panel | 20 | base |
| 22 | dome | 24 | flat |

-continued

REFERENCE NUMERALS IN THE DRAWINGS

| 26 | bevel | 28 | illuminated warning panel |
|---|---|---|---|
| 30 | upward facing surface | 31 | downward facing surface |
| 32 | light pipe | 34 | exit surface |
| 36 | light | 38 | electrical connector |
| 40 | cable | 42 | cable access |
| 44 | shelf | 46 | insert |
| 48 | surrounding structure | 50 | well |
| 52 | clear cover | 54 | mounting substrate |
| 56 | LED | 58 | power supply |
| 59 | light housing | 60 | molded insert |
| 62 | base | 64 | integral light pipe |
| 66 | cavity | 68 | LED |
| 70 | channel | 72 | wires |
| 74 | connector | 76 | overmolded concrete |
| 78 | potting resin | | |

DETAILED DESCRIPTION OF THE INVENTION

Figure 5:
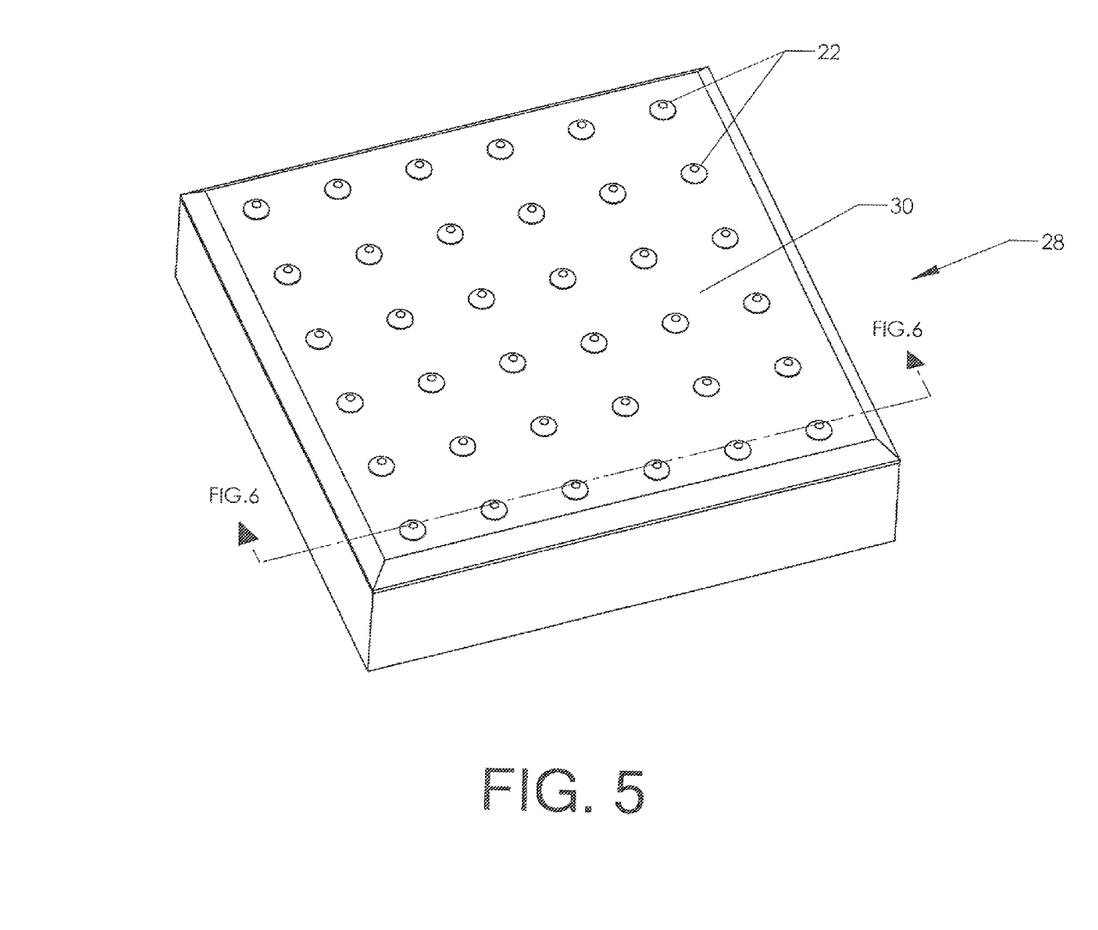
FIG. 5 is a detectable warning panel made according to the present invention.

FIG. 5 shows a first embodiment of the present invention. The version shown is intended to combine the features of a detectable warning panel with the structural strength of a sidewalk tile. Thus, it is made thick and strong. Illuminated warning panel 28 includes an array of protruding domes 22 on upward facing surface 30. The array geometry and dome geometry may be any suitable configuration and is preferably similar to the geometry used in prior art warning panels. However, each dome includes an illuminated surface that makes the warning panel more conspicuous in low light. In the example shown, the illuminated surface is the flat portion at the top of each dome.

Figure 6:
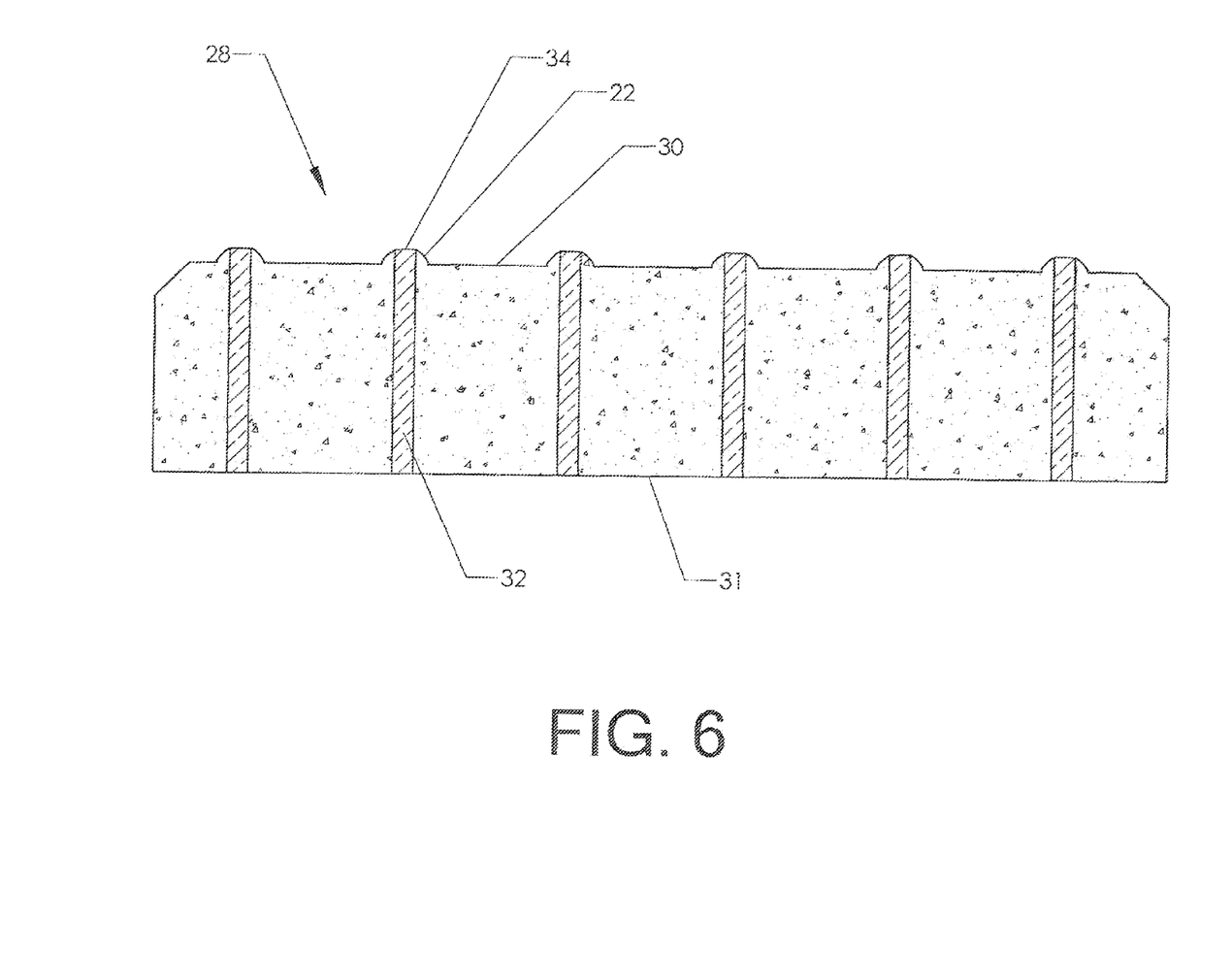
FIG. 6 is a sectional elevation view, showing the panel of FIG. 5.

FIG. 6 shows a sectional elevation view through the embodiment of FIG. 5. A vertically-oriented light pipe 32 is provided for each dome 22. The lower extreme of each light pipe lies proximate downward facing surface 31. The upper extreme of each light pipe (exit surface 34) lies proximate the top of each dome 22. The light pipes are of course made of tight-transmitting material. The balance of the illuminated warning panel may be made of opaque material—such as concrete.

Figure 7:
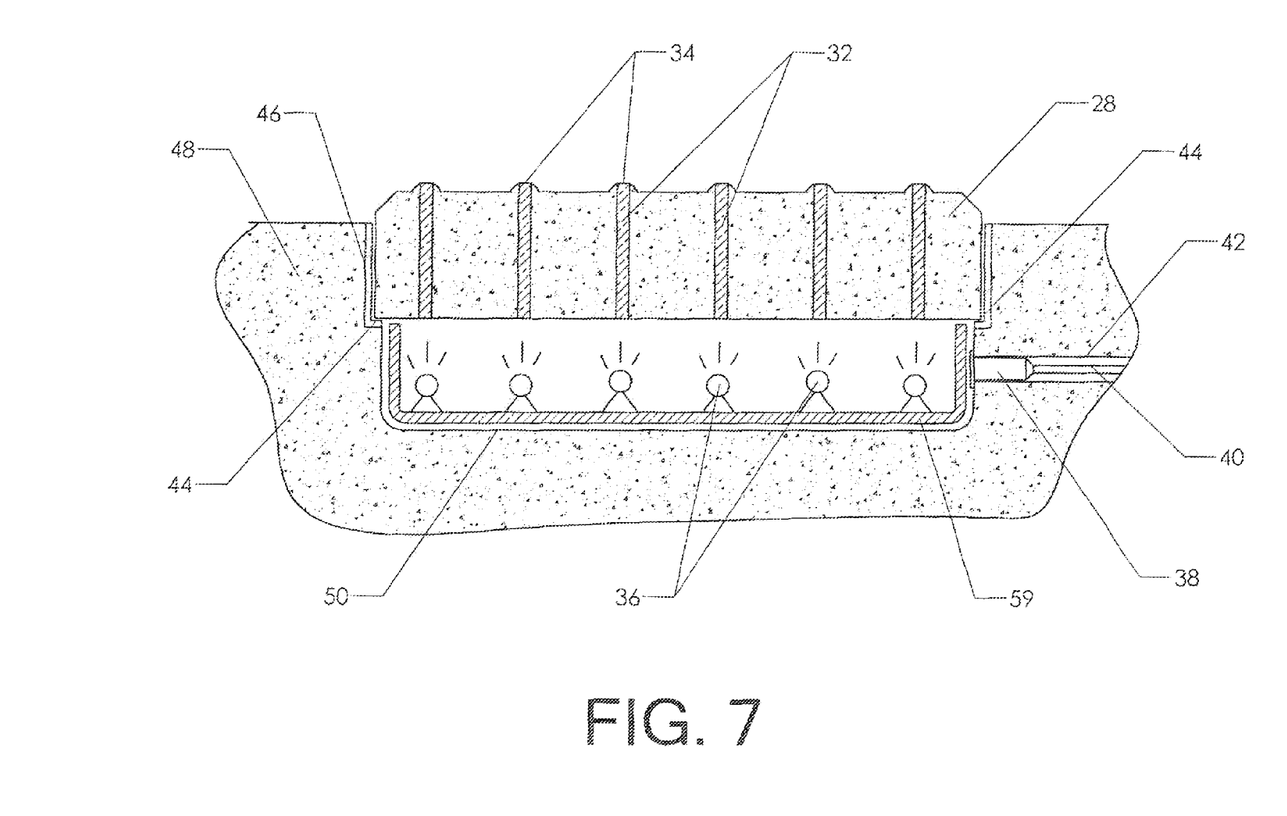
FIG. 7 is a sectional elevation view, showing the panel of FIG. 5 installed in a surrounding structure.

FIG. 7 shows the illuminated warning panel of FIG. 6 after it has been installed in a sidewalk. The installation shown in FIG. 7 is simply one example. There are many other ways to install the invention. In this particular example, however, a cavity has been created in surrounding structure 48. The surrounding structure is primarily cast concrete, as is typical for sidewalks. The perimeter of the cavity is lined with a metal insert 46. Insert 46 includes shelf 44.

Shelf 44 is positioned to support illuminated warning panel 28 when the warning panel is placed as shown. Specifically, a downward facing surface on illuminated warning panel 28 bears against shelf 44. It is preferable for the cavity in surrounding structure 48 to surround the illuminated warning panel on all sides so that is will not slide out of position once it is placed in the cavity. Of course, a particular warning panel may be abutted on one or more sides by another warning panel. Gravity holds the illuminated warning panel or panels in place. It is also possible to use fasteners or adhesives to further secure the warning panel or panels.

As explained previously, an array of light pipes 32 is included in illuminated warning panel 28. In this example, each light pipe extends from the downward facing surface of the warning panel to the top of one of the raised domes. The light pipes are made of a light transmitting material, such as a thermoplastic like acrylic (poly methyl methacrylate). The material may either be transparent (following Snell's Law) or translucent (transmitting light while not strictly adhering to Snell's Law). It is preferable for the light pipes to have a light transmissibility greater than 40% and even more preferable for them to have a transmissibility greater than 70%.

The reader will observe that the light pipes are vertically oriented. A light pipe is customarily thought of as having an entry surface(s), an exit surface(s), and a boundary surface(s). The light pipe's purpose is to transmit light received through the entry surface to the exit surface. The boundary surface preferably reflects most of the light traveling through the light pipe. In the example of FIG. 7, the light pipes are cylindrical. The boundary surface is the wall of the cylinder. The entry surface is the planar bottom of the cylinder. The exit surface is the top of the cylinder (labeled as exit surface 34) in the view.

The entry and boundary surfaces are preferably given a smooth finish. For the entry surface, the smooth finish admits the light without significant attenuation. For the boundary surface, the smooth finish enhances internal reflectivity and reduces transmission losses. The exit surface may be smooth. It may be desirable, however, to give the exit surface a diffused finish so that it scatters the light evenly. It may also be desirable to coat the boundary surface with a reflective cladding, such as a nickel cladding.

In the example of FIG. 7, the light source is placed beneath illuminated warning panel 28. Well 50 is provided beneath shelf 44 to house the light source. Light housing 59 is contained within well 50. The light, housing preferably contains a plurality of lights 36. Even more preferably the light housing contains a light 36 located beneath the entry surface of each light pipe 32.

The light housing may contain power supply circuitry, switching circuitry, and other features suitable for dimming or switching the lights it contains. It is possible to mount each light on a printed circuit board ("PCB") so that the PCB properly locates the lights. It is also possible to mount the lights on flexible circuits or ribbon circuits.

Electrical power is supplied to the light housing via cable 40 and electrical connector 38. Cable 40 is routed through cable access 42. The electrical connection may also be made through a conventional pigtail that protrudes from the light housing. The connections allow multiple warning panels to be electrically connected in parallel. Since the components are located in a sidewalk, it is desirable to provide waterproofing and appropriate drainage.

Illuminated warning panel 28 is intended to be a structural element in the sidewalk. Pedestrian traffic and other traffic will exert normal forces on the top of the warning panel. It must be able to withstand these forces without failing. Suitable materials should be selected. As explained previously, the light pipes are preferably made of a light-transmitting thermoplastic. The balance of the volume of the illuminated warning panel may be made from concrete. It is preferable to use a reinforced concrete in order to prevent cracking. Glass fiber may be used as a reinforcing element. Steel wire can also be used.

Those skilled in the art will know that many other materials could be substituted for concrete. Exemplary substitute materials include polyurethane, ABS, and cast iron. Likewise, the light pipes could be made of other materials such as recycled glass.

Figure 8:
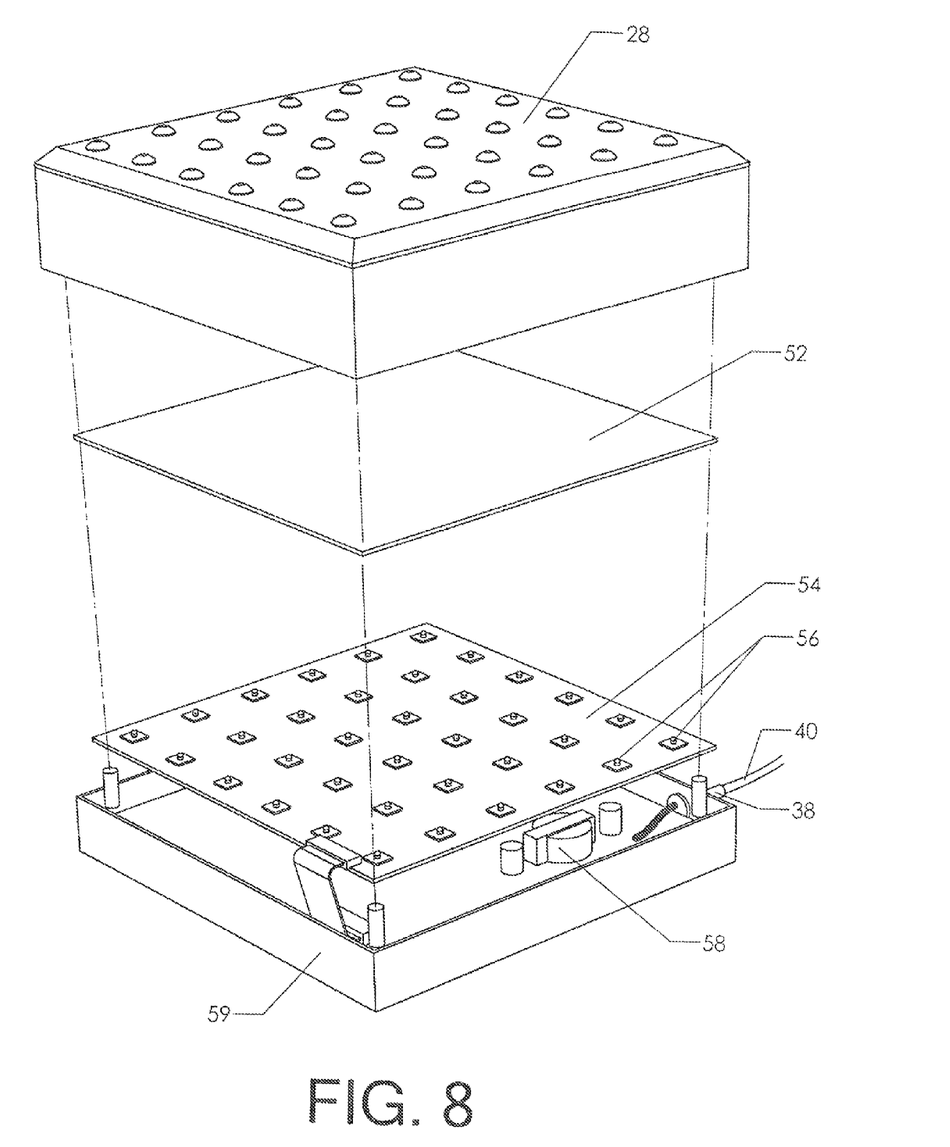
FIG. 8 is an exploded perspective view, showing an exemplary embodiment of the present invention prior to installation.

FIG. 8 provides an exploded view of some of the components shown in FIG. 7. Light housing 59 contains a PCB including power supply 58. The lights themselves are a large array of light emitting diodes ("LED's") 56 attached to mounting substrate 54. The mounting substrate may be separated from the PCB by an array of standoffs. In the example shown, a ribbon cable connects the PCB to the array of LED's. Clear cover 52 is attached to the top of the light housing. It covers and seals the housing in order to exclude moisture. However, it allows the light produced by the LED's to escape upward.

In this example, one LED is provided directly beneath the entry surface of each light pipe in illuminated warning panel 28. The LED's are preferably of the type including a focusing reflector behind the diode and a focusing lens in front of the diode. This type of LED produces a fairly narrow beam analogous to the beam of a flashlight. The beam travels upward through clear cover 52 and then travels through the entry surface of each light pipe. The beam then travels upward through the light pipe until it reaches the exit surface of each light pipe.

Figure 9:
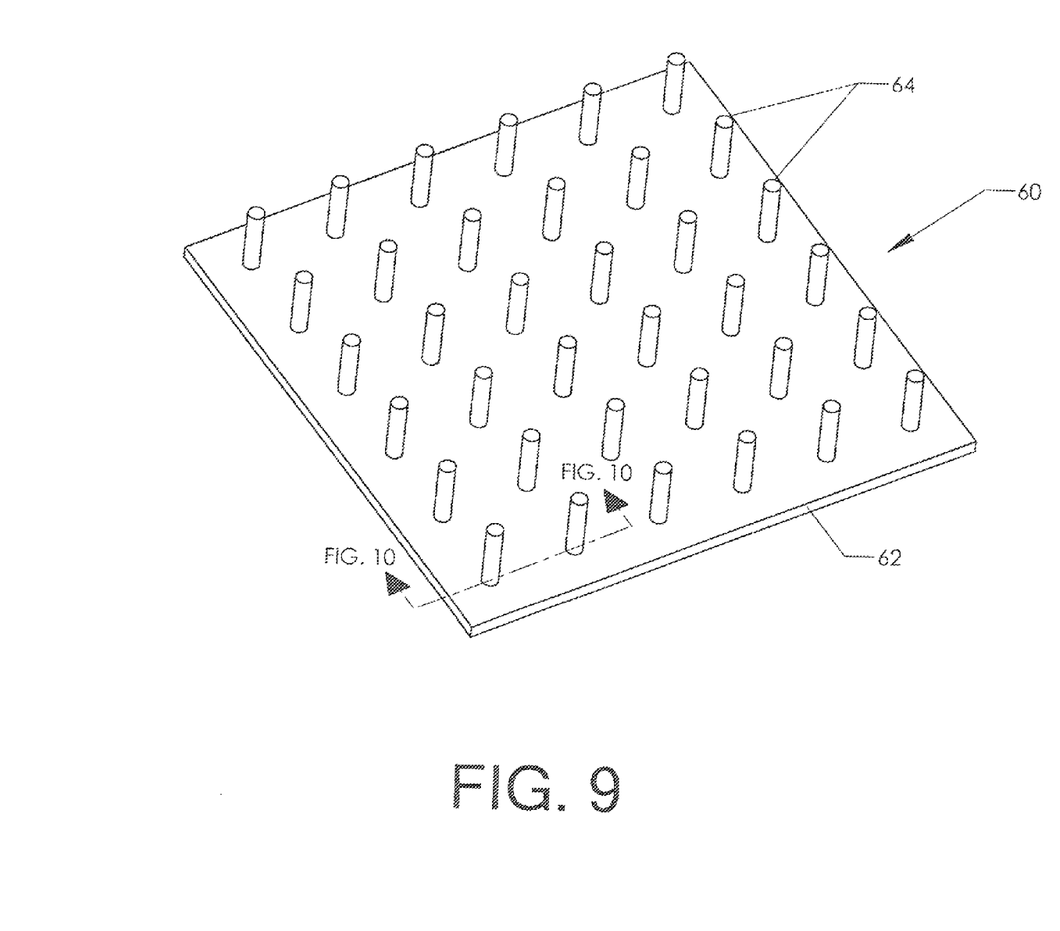
FIG. 9 is a perspective view, showing a molded insert that may be used to create an embodiment of the present invention.
Figure 10:
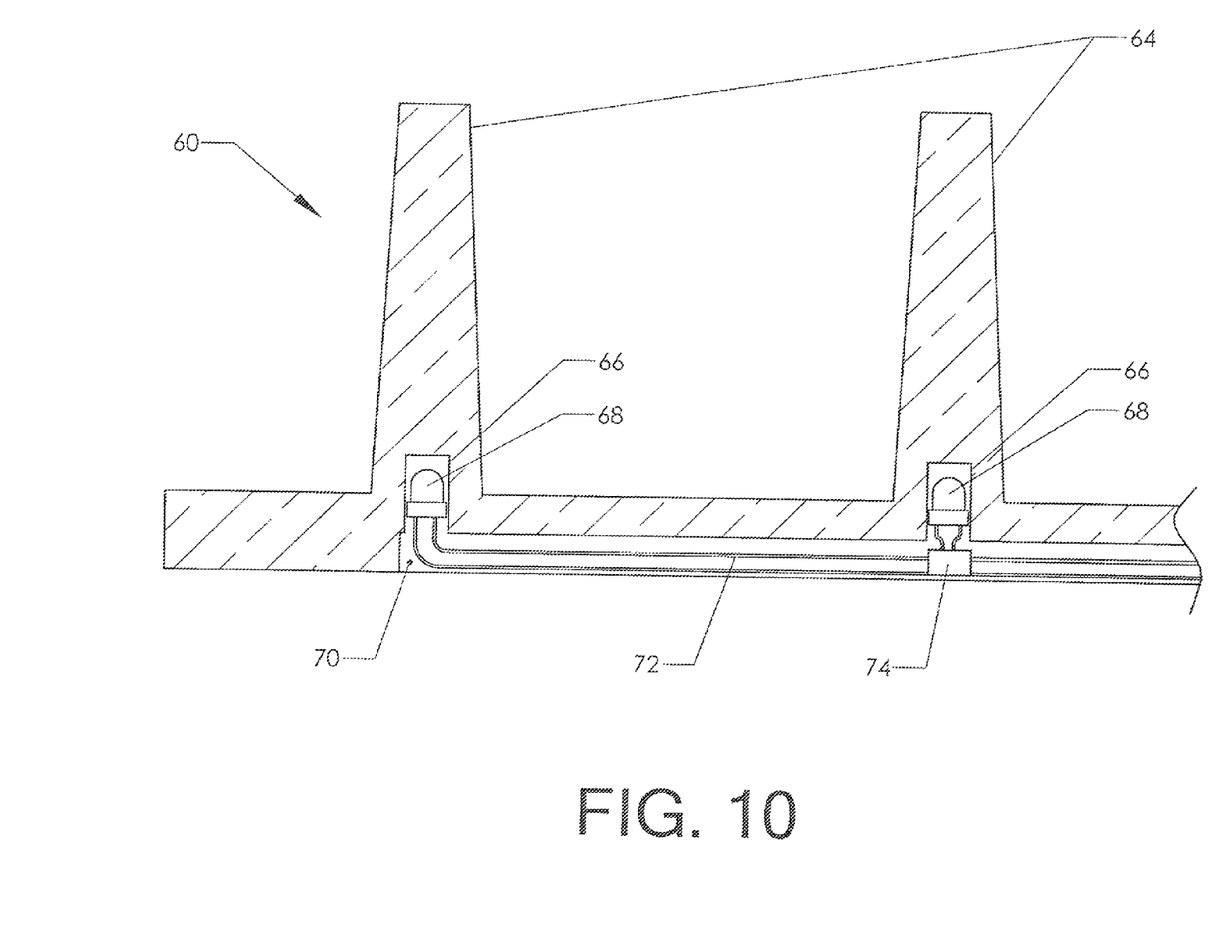
FIG. 10 is a sectional elevation view, showing light sources installed in the molded insert of FIG. 9.
Figure 11:
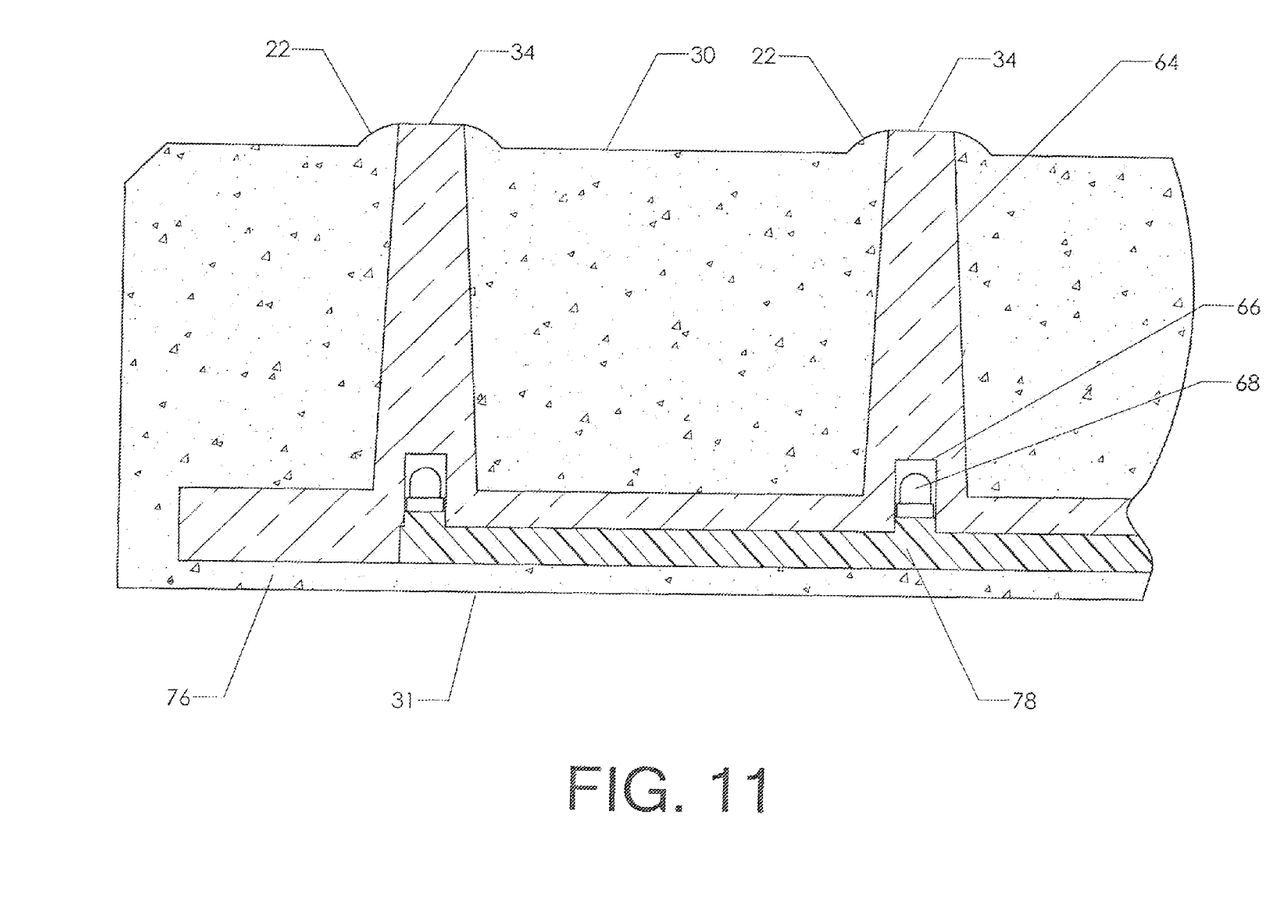
FIG. 11 is a sectional elevation view, showing the inclusion of the assembly of FIG. 10 in as completed detectable warning panel.

The same light pipe configuration can be created using many different construction techniques. FIGS. 9-11 show a different approach. FIG. 9 depicts molded insert 60. This is a single piece of molded thermoplastic resin that incorporates the entire array of light pipes. In this example, 36 integral light pipes 64 protrude from base 10.

FIG. 10 shows a detailed sectional view through base 62 and two integral light pipes 64. A cavity 66 is included in the lower portion of each of the integral light pipes. A single LED 68 is placed within each cavity 66. The LED's are electrically connected using wires 72 and connectors 74. Channels 70 are provided in base 62 to accommodate the wires and connectors. A matrix of channels connects the cavities. Additional channels and cavities may incorporate power supplies, control circuitry, and other components needed to operate the light source.

The LED's are preferably of the focusing type discussed previously. In this embodiment, the entry surface for each light pipe is the portion of each cavity 66 lying directly above the LED.

A tough, water-resistant assembly can be created using this approach. FIG. 11 provides a sectional view through a completed assembly. Once the LED's, wires, connectors, and other components are installed, the assembly is inverted and a liquid potting resin is added to the open channels. The liquid potting resin cures to form an adhered solid. This is denoted as potting resin 78. The LED's seal the upper portion of each cavity so that the potting resin does not enter. In other embodiments a clear potting resin may be used and this may be allowed to flow completely around the LED's.

Once the potting resin cures, the assembly of molded insert 60 and the potted components is placed in a concrete mold. Overmolded concrete 76 is then placed around the potted assembly and allowed to harden. The result is shown in FIG. 11. Each integral light pipe 64 has an entry surface right over an LED and an exit surface 34 at the top of a dome 22. The light source and the light pipes are all contained between upward facing surface 30 and downward facing surface 31. Only an electrical connection extends out of the molded assembly. The result is a tough, integral construction.

Returning now to FIG. 5, the operation of the invention will be briefly described. In daylight, illuminated warning panel 28 will closely resemble prior art warning panels. It may be given a bright color, such as yellow. Domes 22 will appear as for the prior art. The reader will note the presence of an exit surface for a light pipe in the middle of each dome. However, the exit surface may be given the same color as the surrounding upward facing surface 30, so that the difference is not very noticeable (The exit surfaces will not likely appear exactly as the surrounding surface because they must be able to transmit light and will therefore not be completely opaque).

The appearance of the invention will change dramatically in low light conditions. Once the light source is switched on, each exit surface will appear as a brightly illuminated disk against the dark background of the sidewalk. A user approaching a sidewalk/roadway interface will immediately note the presence of an array of lights on the walking surface itself.

The light source may simply be switched on and off as needed. Alternatively, a dimming function may be used to vary the voltage provided to the light source in order to provide more or less light as needed. One could even provide a lighting controller with two or more "stepped" voltages.

The lighting controller may receive input from a light sensor that is integral to the warning panel itself. As an example, a light sensor may be placed at the bottom of one of the light pipes in order to sense the amount of ambient light falling on the upward facing surface of the panel. A remote light sensor could also be used—such as an ambient light sensor on a nearby street lamp.

Many other variations will occur to those skilled in the art. Examples of possible variations include:

(1) The exit surface of each light pipe need not be planar. It may in fact form part of a curved surface such as the surface of the surrounding dome;

(2) A variety of exit surface shapes may be used for the different light pipes in a single warning panel;

(3) A proximity sensor may be included to sense the approach of a pedestrian. The light source could be switched on only when a pedestrian is approaching the warning panel;

(4) The light source could be flashed according to the condition of a nearby pedestrian crossing signal or for other reasons;

(5) The illumination source could be powered by a solar array, with the array being located on the upward facing surface of the panel itself or in a remote location;

(6) Although the exemplary embodiments have shown vertically-oriented light pipes, this need not always be the case. The light pipes could be angularly offset and could in some instances include a bent path;

(7) Some embodiments may include illumination in only a portion of the domes;

(8) Some embodiments may be designed to attach to the top of an existing sidewalk surface rather than to fit into a cavity in a sidewalk; and (9) Some embodiments will use a particular light to feed multiple light pipes, up to an embodiment in which a single light feeds all the light pipes.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the following claims rather than the examples given.

Having described my invention, I claim:

1. A method for illuminating a detectable warning panel located in a sidewalk, comprising:
  a. providing a detectable warning panel, including,
    i. an upward facing surface,
    ii. a downward facing surface,
    iii. a plurality of illuminated domes extending upward from said upward facing surface,
    iv. a vertically-oriented light pipe in each of said illuminated domes, wherein each of said light pipes has an exit surface located in a top of one of said plurality of illuminated domes and an entry surface located distal to said exit surface;
b. providing a cavity in said sidewalk;
c. providing a light source in said cavity;
d. placing said detectable warning panel in said cavity, with said light source positioned to cast light upon said entry surface of said light pipes; and
e. switching on said light source.

2. A method for illuminating a detectable warning panel as recited in claim 1, wherein:
a. said light source includes a plurality of individual lights; and
b. at least one of said individual lights is placed adjacent to each of said entry surfaces of said light pipes.

3. A method for illuminating a detectable warning panel as recited in claim 2, wherein each individual light is a light emitting diode.

4. A method for illuminating a detectable warning panel as recited in claim 1, wherein:
a. each of said light pipes is made of a transparent thermoplastic; and
b. the balance of said detectable warning panel is made of concrete.

5. A method for illuminating a detectable warning panel as recited in claim 2, wherein
a. each of said light pipes includes a cavity; and
b. said entry surface for each of said light pipes is located in said cavity.

6. A method for illuminating a detectable warning panel as recited in claim 5, wherein:
a. each of said individual lights is a light emitting diode; and
b. each of said light emitting diodes is located within one of said cavities.

7. A method for illuminating a detectable warning panel as recited in claim 6, wherein said cavities are filled with potting resin after said light emitting diodes have been placed in said cavities.

8. A method for illuminating a detectable warning panel located in a sidewalk, comprising:
a. providing a detectable warning panel, including,
i. a plurality of illuminated domes extending upward from said detectable warning panel,
ii. a vertically-oriented light pipe contained within each of said illuminated domes, each of said light pipes having an entry surface and an exit surface, wherein said exit surface is located in a top of one of said domes and said entry surface is located distal to said exit surface;
b. providing a light source;
c. placing said light source in a position where said light source casts light upon said entry surfaces of said light pipes;
d. placing said detectable warning panel and said light source in said sidewalk; and
e. switching on said light source.

9. A method for illuminating a detectable warning panel as recited in claim 8, wherein:
a. said light source includes a plurality of individual lights; and
b. at least one of said individual lights is placed adjacent to each of said entry surfaces of said light pipes.

10. A method for illuminating a detectable warning panel as recited in claim 9, wherein each individual light is a light emitting diode.

11. A method for illuminating a detectable warning panel as recited in claim 8, wherein:
a. each of said light pipes is made of a transparent thermoplastic; and
b. the balance of said detectable warning panel is made of concrete.

12. A method for illuminating a detectable warning panel as recited in claim 9, where
a. each of said light pipes includes a cavity; and
b. said entry surface for each of said light pipes is located in said cavity.

13. A method for illuminating a detectable warning panel as recited in claim 12, wherein:
a. each of said individual lights is a light emitting diode; and
b. each of said light emitting diodes is located within one of said cavities.

14. A method for illuminating a detectable warning panel as recited in claim 13, wherein said cavities are filled with potting resin after said light emitting diodes have been placed in said cavities.

15. A method for illuminating a detectable warning panel located in a sidewalk, comprising:
a. providing a detectable warning panel, including,
i. an upward facing surface,
ii. a downward facing surface,
iii. a plurality of illuminated domes extending upward from said upward facing surface,
iv. a vertically-oriented light pipe contained within each of said illuminated domes, each of said light pipes having an entry surface and an exit surface, wherein said exit surface is located in a top of one of said domes and said entry surface is located on said downward facing surface;
b. providing a light source adjacent to said downward facing surface of said warning panel;
c. placing said light source and said detectable warning panel in said sidewalk; and
d. switching on said light source.

16. A method for illuminating a detectable warning panel as recited in claim 15, wherein:
a. said light source includes a plurality of individual lights; and
b. at least one of said individual lights is placed adjacent to each of said entry surfaces of said light pipes.

17. A method for illuminating a detectable warning panel as recited in claim 15, wherein each individual light is a light emitting diode.

18. A method for illuminating a detectable warning panel as recited in claim 15, wherein:
a. each of said light pipes is made of a transparent thermoplastic; and
b. the balance of said detectable warning panel is made of concrete.

19. A method for illuminating a detectable warning panel as recited in claim 16, wherein
a. each of said light pipes includes a cavity; and
b. said entry surface for each of said light pipes is located in said cavity.

20. A method for illuminating a detectable warning panel as recited in claim 19, wherein:
a. each of said individual lights is a light emitting diode; and
b. each of said light emitting diodes is located within one of said cavities.

* * * * *